(12) United States Patent
Sayyah et al.

(10) Patent No.: US 7,856,156 B2
(45) Date of Patent: Dec. 21, 2010

(54) LITHIUM NIOBATE MODULATOR HAVING A DOPED SEMICONDUCTOR STRUCTURE FOR THE MITIGATION OF DC BIAS DRIFT

(75) Inventors: Keyvan Sayyah, Santa Monica, CA (US); Robert R. Hayes, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 12/196,936

(22) Filed: Aug. 22, 2008

(65) Prior Publication Data

US 2010/0046878 A1     Feb. 25, 2010

(51) Int. Cl.
G02F 1/035 (2006.01)
G02F 1/01 (2006.01)
G02F 1/03 (2006.01)
G02F 1/07 (2006.01)

(52) U.S. Cl. .................... 385/2; 385/1; 359/246
(58) Field of Classification Search ............ 385/1–3
See application file for complete search history.

(56) References Cited

U.S. PATENT DOCUMENTS

| | | | |
|---|---|---|---|
| 5,153,934 A * | 10/1992 | Okayama et al. | 385/40 |
| 5,214,724 A * | 5/1993 | Seino et al. | 385/2 |
| 5,388,170 A * | 2/1995 | Heismann et al. | 385/4 |
| 5,404,412 A | 4/1995 | Seino et al. | |
| 5,473,711 A * | 12/1995 | Hakogi et al. | 385/14 |
| 6,198,855 B1 * | 3/2001 | Hallemeier et al. | 385/2 |
| 6,661,934 B2 * | 12/2003 | Burns et al. | 385/2 |
| 2006/0198581 A1 | 9/2006 | Belmonte et al. | |
| 2006/0233494 A1 * | 10/2006 | Nagata | 385/40 |
| 2008/0069491 A1 | 3/2008 | Kissa et al. | |

OTHER PUBLICATIONS

"Resistivity-dopant density relationship for boron-doped silicon," by Thurber et al, Journal of the Electrochemical Society, Solid-State Science and Technology, Oct. 1980, pp. 2292-2294.*
"DC drift activation energy of LiNbO3 optical modulators based on thousands of hours of active accelerated aging tests," by Nagata et al, IEEE Photonics Technology Letters, vol. 14, No. 8, Aug. 2002, pp. 1076-1078.*
"RF-photonic Link Using A Resonantly-Enhanced Mach-Zehnder Optical Modulator," by Nguyen et al, International Topical Meeting on Microwave Photonics, Oct. 2005, pp. 253-256.*
"Integrated-optic Mach-Zehnder modulator with linearized modulation characteristic," by Tavlykaev et al, Proceedings of SPIE, vol. 1932, 174 (1993).*
Madison, S., et al., "Monolithic Integration of AlGaN/GaN-LiNbO3 Optical-Electronic Structures", IEEE, 2004, pp. 232-233.
Muller, R., et al., "Device Electronics for Integrated Circuits", Second Edition, John Wiley & Sons, 1986, pp. 147-149.

* cited by examiner

*Primary Examiner*—Ryan Lepisto
*Assistant Examiner*—Robert Tavlykaev

(57) ABSTRACT

There is provided in one of the embodiments of the disclosure a lithium niobate modulator structure for mitigating DC bias drift comprising a highly doped semiconductor layer patterned above an optical waveguide having one or more DC sections and an RF section, wherein a metal layer or contact is in contact with a portion of the semiconductor layer and a buffer layer is deposited in the RF section. There is provided in another embodiment of the disclosure a method for making a lithium niobate electro-optical modulator for mitigation of DC bias drift.

21 Claims, 5 Drawing Sheets

DC BIAS DRIFT IN A CONVENTIONAL LN OPTICAL MODULATOR

TIME = T1
TIME = T2 > T1
DC DRIFT

MODULATOR DC VOLTAGE

OUTPUT INTENSITY ($I_{OUT}/I_{IN}$)

FIG.2

LITHIUM NIOBATE MODULATOR HAVING A DOPED SEMICONDUCTOR STRUCTURE FOR THE MITIGATION OF DC BIAS DRIFT

BACKGROUND OF THE DISCLOSURE

1) Field of the Disclosure

The disclosure relates to lithium niobate electro-optical modulators, and more particularly, to a lithium niobate electro-optical modulator having a doped semiconductor structure for the mitigation of DC bias drift.

2) Description of Related Art

Electro-optical modulators are optical devices in which a signal-controlled element displaying electro-optic effect is used to modulate a beam of light. Electro-optical modulators are key components for high-speed optical transmission systems. Such electro-optical modulators are typically made from lithium niobate ($LiNbO_3$), referred to as "LN", because of its high electro-optic coefficient and high-quality crystals. LN modulators are primarily used as electro-optical modulators that convert high-speed electrical signals to optical signals for long distance communication systems, such as free space laser communication systems for satellite and terrestrial applications, and terrestrial and underwater fiber optic communication systems. The design of LN electro-optical modulators typically employ waveguides fabricated on a planar substrate in a Mach-Zehnder configuration (see FIG. 1).

An occurrence associated with known LN electro-optical modulators is the occurrence of DC (Direct Current) bias drift caused by undesirable charge generation and charge redistribution in the device. DC bias drift is a change in the output voltage of a power supply used to bias the modulator at a certain operating point, over a certain period of time, Steady increases to the voltage required to maintain the bias condition can cause a control system reset to occur, which can result in loss of data. In addition, the drift in DC bias voltage of LN electro-optical modulators results in a phase shift of relative intensity. Over time, this DC bias voltage can no longer be corrected for or compensated due to growth in the size of the bias. DC bias drift manifests itself in a slow drift in the DC bias voltage of the modulator required to maintain a fixed output light intensity when the device is operated in the Mach-Zehnder intensity modulator configuration. Known devices exist for controlling such DC bias drift. For example, feedback loops may be used to monitor and adjust the DC supply voltage to maintain proper operation. However, such feedback loops must be frequently monitored which can be time consuming, and such feedback loops may be ineffective with satellite and space applications since the supply voltage is only in a certain range of voltage, after which it runs out. In addition, a known LN device for reducing DC bias drift is disclosed in U.S. Pat. No. 5,404,412 to Seino et al. This patent discloses an optical waveguide device with an LN substrate and a doped multi-component oxide buffer layer on top of the entire waveguide structure, that is, in both the DC and RF sections of the waveguide. The buffer layer has a lower resistivity that results in a decreased DC bias drift. However, such device has problems with reproducibility and consistency in DC bias drift mitigation using the multi-component oxide buffer layer over both the DC and RF sections. Factors that may affect the reproducibility and consistency of this known device may include, but are not limited to, the composition of the oxide compound, the various oxide deposition conditions, and the LN surface preparation prior to deposition.

Accordingly, there is a need for an LN electro-optical modulator having a doped semiconductor structure for the mitigation of DC bias drift that provides advantages over known devices and methods.

SUMMARY OF THE DISCLOSURE

This need for an LN electro-optical modulator having a doped semiconductor structure for the mitigation of DC bias drift, as well as a unique, nonobvious, and advantageous method and system, is satisfied and numerous advantages are discussed herein. Embodiments of the LN electro-optical modulator having a doped semiconductor structure for the mitigation of DC bias drift may provide one or more of the following advantages: provides an LN electro-optical modulator device that gives a predictable and reliable solution for the mitigation of DC bias drift; provides an LN electro-optical modulator structure that mitigates DC bias drift and is simple to implement; provides an LN electro-optical modulator device that is fabricated with a buffer layer only in the RF section and not in the DC sections of the device, thus eliminating a conventional (0.5-1.0 μm (micrometer) thick) oxide buffer layer from the DC sections of the device, which in turn, reduces the DC switching voltage ($V\pi$); provides an LN electro-optical modulator device that eliminates irreproducibility issues by applying the bias voltage directly to the optical waveguide structure; provides an LN electro-optical modulator having a highly doped semiconductor layer on top of the optical waveguide that is electrically contacted by a metal or conductive layer at a point outside the waveguide, thus creating a good contact to allow uniform distribution of the electric field; provides an LN electro-optical modulator device that is simple to construct and is robust and reproducible; provides an LN electro-optical modulator device that minimizes having to use a feedback loop to monitor DC bias drift; provides a method of mitigating DC bias drift using an LN electro-optical modulator as described herein; and provides an LN electro-optical modulator device that can be used in numerous applications including, but not limited to, long distance communication systems, such as free space laser communication systems for satellite and terrestrial applications, and terrestrial and underwater fiber optic communication.

In one of the embodiments of the disclosure, there is provided a Z-cut LN electro-optical modulator comprising: an LN substrate in the form of an optical waveguide having one or more DC sections and an RF section; a highly doped semiconductor layer patterned over the optical waveguide in the one or more DC sections; a buffer layer deposited over the optical waveguide in the RF section; a metal layer that contacts the semiconductor layer; and, one or more electrodes over the optical waveguide in the RF section and in the one or more DC sections.

In another embodiment of the disclosure, there is provided a Z-cut optical modulator device having one or more DC sections and an RF section comprising: an LN substrate; a highly doped semiconductor layer deposited over the optical waveguide in the one or more DC sections; a buffer layer deposited over the optical waveguide in the RF section; a metal layer that contacts the semiconductor layer; and, one or more electrodes over the optical waveguide.

In another embodiment of the disclosure, there is provided a Z-cut LN modulator structure for mitigating DC bias drift comprising a highly doped semiconductor layer patterned above an optical waveguide having one or more DC sections and an RF section, wherein a metal contact is in contact with a portion of the semiconductor layer and a buffer layer is deposited in the RF section.

In another embodiment of the disclosure, there is provided a method for making a Z-cut LN electro-optical modulator comprising: providing an LN substrate in the form of an optical waveguide having one or more DC sections and an RF section; depositing a buffer layer over the optical waveguide in the RF section; depositing a highly doped semiconductor layer patterned over the optical waveguide in the one or more DC sections; depositing a metal layer that contacts the semiconductor layer; and, providing one or more electrodes over the optical waveguide in the RE section and in the one or more DC sections.

BRIEF DESCRIPTION OF THE DRAWINGS

The foregoing and other advantages and features, and the manner in which the same are accomplished, will become readily apparent upon consideration of the following detailed description taken in conjunction with the accompanying drawings which illustrate preferred and exemplary embodiments, but which are not necessarily drawn to scale, wherein:

FIG. 2 is a graph showing DC bias drift in a conventional LN optical modulator having a Mach-Zehnder configuration;

DETAILED DESCRIPTION OF THE DISCLOSURE

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The device and method of the disclosed embodiments may be used in connection with various applications including, but not limited to, long distance communication systems, such as free space laser communication systems for satellite and terrestrial applications, and terrestrial and underwater fiber optic communication systems. Accordingly, one of ordinary skill in the art will recognize and appreciate that the device and method of the disclosure can be used in any number of applications involving LN electro-optical modulators having a doped semiconductor structure for the mitigation of DC bias drift.

Figure 1:
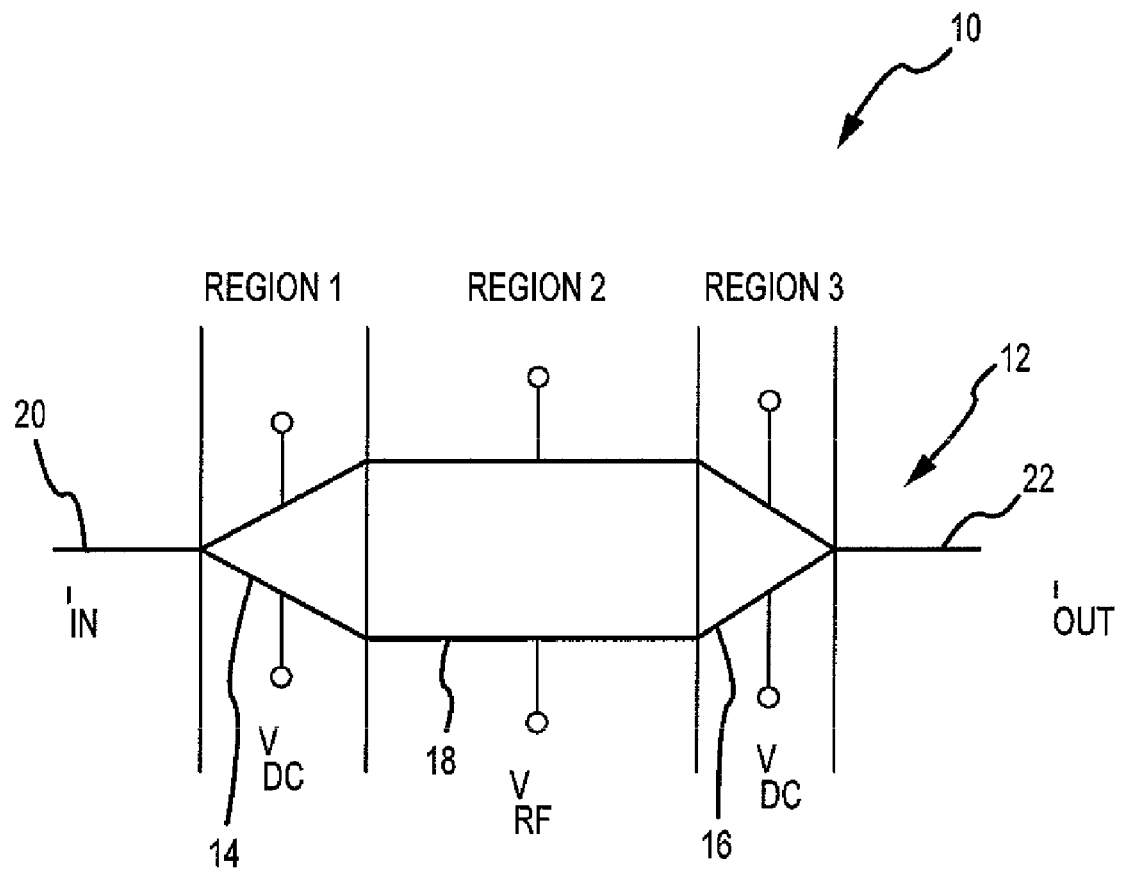
FIG. 1 is a schematic diagram showing a conventional Mach-Zehnder optical modulator.

In one of the disclosed embodiments of the disclosure there is provided a lithium niobate (LN) electro-optical modulator device having a doped semiconductor structure. Preferably, the device mitigates DC bias drift. The LN modulator is preferably of a design in which an optical waveguide structure in a conventional Mach-Zehnder configuration is formed, as shown in FIG. 1. FIG. 1 is a schematic diagram showing a conventional Mach-Zehnder optical modulator 10. FIG. 1 shows the Mach-Zehnder configuration of an optical waveguide 12 having a first DC (direct current) section 14, a second DC section 16, and an RF (radio frequency) section 18. Optical intensity (I) into the waveguide enters at entry point 20, and optical intensity out of the waveguide exits at exit point 22. The disclosed LN modulator device mitigates DC bias drift. The drift in DC bias voltage of a conventional electro-optical modulator results in a shift of intensity versus voltage curve, as shown in FIG. 2. FIG. 2 is a graph showing DC bias drift in a conventional LN optical modulator having a Mach-Zehnder configuration, with the y-axis being the ratio of optical intensity out (Iout)/optical intensity in (Iin), and the x-axis being the DC Voltage, and the intensity curves for two different points in time (T), that is T1 and T2. DC bias drift manifests itself in a slow drift in the DC bias voltage of the modulator required to maintain a fixed output light intensity as a function of time, when the device is operated in the Mach-Zehnder intensity modulator configuration.

Figure 3:
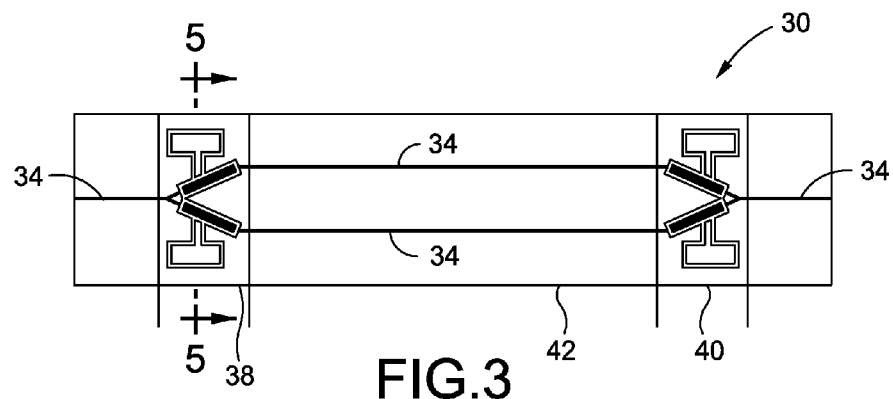
FIG. 3 is a top view of a first disclosed embodiment of the Z-cut LN modulator of the disclosure.
Figure 5:
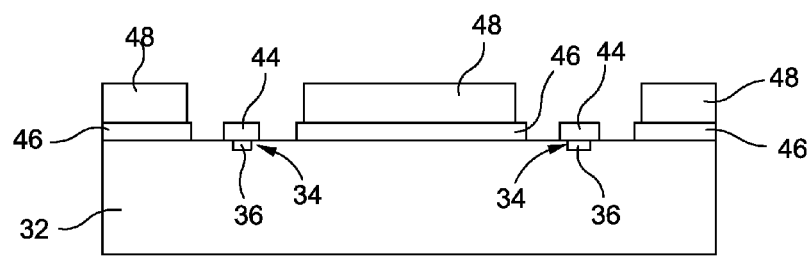
FIG. 5 is a cross-sectional view of the first DC section of the Z-cut LN modulator taken along lines 5-5 of FIG. 3.

FIG. 3 is a top view of a first disclosed embodiment of a Z-cut LN electro-optical modulator 30 of the disclosure. The LN electro-optical modulator for mitigation of DC bias drift comprises an LN substrate 32 (see FIG. 5) in which an optical waveguide structure 34 in the Mach-Zehnder configuration is formed. This can be accomplished by thermal diffusion of a thin diffusion layer 36 (see FIG. 5) into the LN substrate. Preferably, the thin diffusion layer comprises titanium or another suitable metal that may have a thickness of about 600A-1000A (Angstroms) before diffusion. More preferably, the thin diffusion layer may have a thickness of about 850A-900A (Angstroms). Alternatively, this can be accomplished by a proton exchange waveguide formation process. The LN substrate may further comprise a layer of titanium deposited and patterned on top of the substrate and diffused into the substrate. Preferably, after forming the optical waveguide structure, the substrate may have one or more DC sections and an RF section. As shown in FIG. 3, the LN modulator 30 comprises a first DC section 38, a second DC section 40, and an RF section 42. The LN modulator of the disclosed embodiment applies to the first and second DC sections 38, 40, as these are the modulator sections from which the bias drift effect originates. FIG. 5 is a cross-sectional view of the first DC section 38 of the Z-cut LN modulator taken along lines 5-5 of FIG. 3.

The LN modulator further comprises a highly doped semiconductor layer 44 that is patterned over or placed on the optical waveguide structure 34 in the first and second DC sections 38, 40 of the modulator 30 and patterned in a fashion similar to the waveguide, The thickness and the complex refractive index of the semiconductor layer 44 is preferably such that the light guided in the waveguide does not leak out or get highly attenuated as a result of its placement on top of the optical waveguide. The thickness and the real part of the complex refractive index of the semiconductor layer at the operating wavelength determine the degree of light confinement, while the imaginary part of the complex refractive index affects the optical insertion loss of the modulator. The highly doped semiconductor layer may be comprised of a material such as silicon, germanium, gallium arsenide, or another suitable material. The highly doped semiconductor layer preferably has a doping level in the range of $10^{18}$ cm$^{-3}$ to $10^{19}$ cm$^{-3}$ to facilitate good ohmic contact sufficient to allow uniform distribution of the electric field with the metal layer. More preferably, the semiconductor layer comprises a highly doped ($10^{18}$-$10^{19}$ $cm^{-3}$) n-type or p-type silicon (Si), either in a polycrystalline or amorphous state. The highly doped semiconductor layer preferably is thin and has a thickness in the range of 200A-800A (Angstroms). More preferably, the thickness is about 500A (Angstroms). The highly doped semiconductor layer functions as an electrical contact layer over the optical waveguide in the DC sections and as an upper cladding layer for the optical waveguide. Preferably, the semiconductor layer is formed directly on top of the optical waveguide formed in the LN substrate. The real part of the complex refractive index (n) at communication wavelengths (1400 nm-1600 nm (nanometers)) for silicon is 3.45 at the above doping levels. An optical waveguide structure comprising an LN cladding or substrate with an index of 2.15, a titanium (Ti) diffused core region with an index of 2.16, and an outer cladding of 500A (Angstroms) silicon with an index of 3.45 (with air on top) results in excellent optical confinement in the waveguide core, with very little light leaking into the cladding regions. The imaginary part of the complex refractive index (k) of silicon is $5 \times 10^{-5}$ at a doping level of $10^{18}$ $cm^{-3}$, and is approximately $10^{-3}$ at a doping level of $10^{19}$ $cm^{-3}$. The optical insertion loss of the waveguide at these k-values is almost negligible. Thus, the thin and highly doped semiconductor layer may not result in any loss of the guided light propagating through the modulator optical waveguide structure.

The thin and highly doped semiconductor layer provides a uniform DC electric field along the length of the optical waveguides in the DC sections of the modulator without the use of a metallic layer on top of it. This is due to the fact that the presence of a metal layer on top of the thin semiconductor layer may result in a significant (>10 dB/cm (decibel/centimeter)) optical insertion loss in the waveguide. The LN modulator provides a uniform electric field along the length of the optical waveguide in the DC sections by using the highly doped semiconductor layer and electrically contacting it with an ohmic metal layer or contact in a very small segment of the waveguide (<50 μm (micrometer)) outside of the waveguide region. The high doping level of the thin semiconductor layer greatly facilitates ohmic contact formation using a suitable metal to allow uniform distribution of the electric field with the metal.

The semiconductor layer 44 also allows for the uniform distribution of the electric field supplied throughout the length of the DC section electrodes while being applied only at a single point of contact. The uniform electric field without the presence of a metal layer on top of the entire length of the DC section electrodes results in minimal optical insertion loss in the waveguide. Because of appropriate thickness, refractive index and absorption coefficient at the operating optical wavelength, it does not result in loss of light confinement in the waveguide and minimally affects the optical attenuation in the waveguide.

The LN modulator further comprises a buffer layer 46 deposited over the optical waveguide in the REF section. The buffer layer may comprise oxides, such as silicon dioxide, tin oxide, indium oxide, or a combination of such oxides, such as a mixture of two or more of silicon dioxide, tin oxide and indium oxide. The buffer layer may also comprise other suitable materials. The LN modulator further comprises one or more electrodes 48 (see FIG. 4) over the buffer layer 46 and the optical waveguide in the RF section and one or more electrodes over the optical waveguide in the DC sections. The electrodes may be made of a material such as gold, copper, aluminum, or another suitable material. The buffer layer 46 may be used in the RF section between the electrode structure and the optical waveguide in order to prevent optical loss in the waveguide due to the presence of the metal electrode. The electrodes are preferably separated from the substrate by the buffer layer. The buffer layer prevents optical absorption of the optical mode by the metal electrodes. Typically, silicon dioxide ($SiO_2$) is used as the buffer layer due to its optical transparency at 1.55 microns and its low dielectric constant. The electrode structure may be used in the RF section in order to minimize the RF loss along its length, as well as to provide index matching between the optical and electrical fields in a traveling wave modulator configuration.

The LN modulator further comprises a metal layer 50 or conductive layer. The metal layer preferably contacts the semiconductor layer. The metal layer may contact the semiconductor layer outside the optical waveguide or optical waveguide region (see FIG. 6) or inside the optical waveguide or optical waveguide region. The metal layer may comprise a metal such as gold, aluminum, a gold/aluminum mixture, copper, or another suitable metal. The semiconductor layer is preferably electrically contacted by the conductive layer at a single portion or point anywhere outside the waveguide area on the structure in the first and second DC sections of the modulator device. The high conductivity of the semiconductor layer facilitates the formation of a good ohmic contact by a suitable metal, as well as allows the uniform distribution of the electric field supplied throughout the length of the DC sections or electrode sections while being applied at a contact point. The LN modulator of the disclosure is preferably concerned with the DC sections of the device. The RF section 40 of the modulator remains unchanged.

Figure 4:
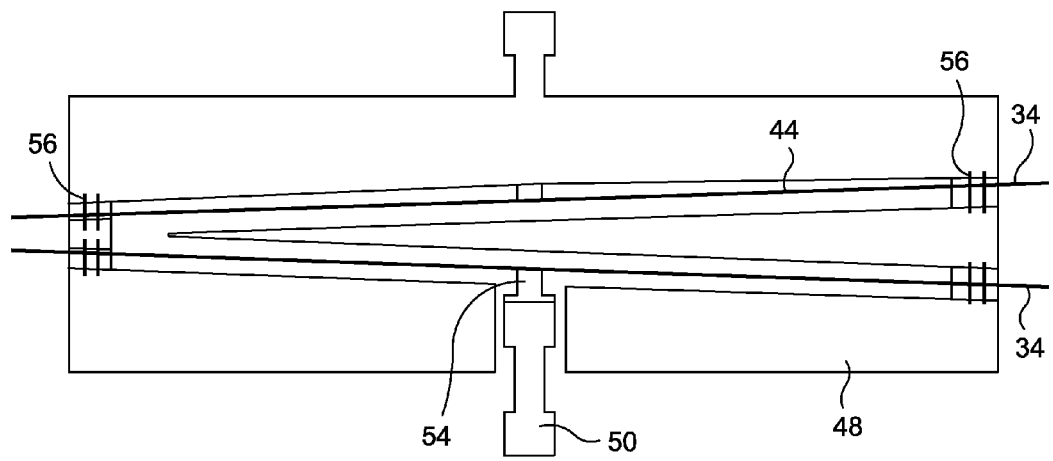
FIG. 4 is an enlarged cut-away top view of the first DC section of the Z-cut LN modulator of FIG. 3.
Figure 6:
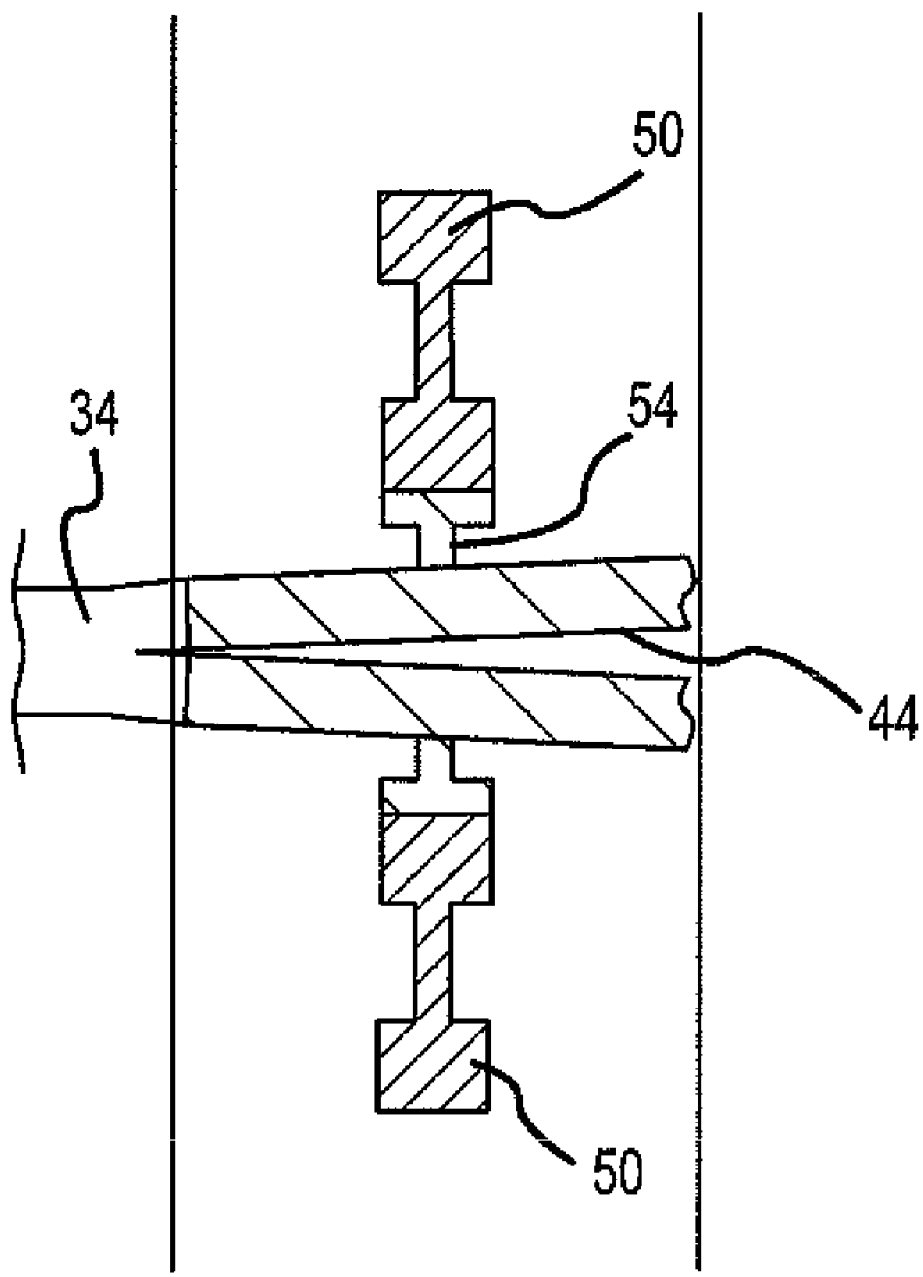
FIG. 6 is an enlarged cut-away top view of the first DC section of a disclosed embodiment of the LN modulator of the disclosure.

FIG. 4 is an enlarged cut-away top view of the first DC section of the Z-cut LN modulator of FIG. 3. FIG. 4 shows the waveguide 34, the semiconductor layer 44 on top of the waveguide, the metal layer contact 50, the electrode 48, a stem portion 54 of the semiconductor layer, and a wire bond 56. FIG. 6 is an enlarged cut-away top view of the first DC section of the LN modulator of the disclosure. FIG. 6 shows the waveguide 34, the semiconductor layer 44, the stem portion 54 of the semiconductor layer, and the metal layer contact 50, where the metal contact to the doped semiconductor layer is made outside the waveguide region. Such a configuration minimizes the optical attenuation through the waveguide.

The LN modulator structure of the disclosure results in the direct application of the DC bias voltage on the waveguide section, hence allowing the elimination of the standard oxide buffer layer above the optical waveguide in the DC sections which can cause DC bias drift of the LN modulator. Additionally, due to the elimination of the conventional (0.5-1.0 μm (micrometer) thick) oxide buffer from the DC section of the device, as is typically included in conventional LN modulators, the DC switching voltage (Vπ) of the LN modulator of the disclosed embodiments may be reduced as well. The LN modulator structure of the disclosed embodiments has minimal or no reproducibility issues as do conventional LN modulators since there is no oxide buffer layer in the DC section of the device, and the bias voltage is applied directly to the optical waveguide structure. Furthermore, the disclosed embodiments have the added advantage that the DC switching voltage is reduced compared to conventional devices since the bias voltage is directly applied to the optical waveguide without any buffer layer in between. The multi-component buffer oxide layer, which is the main enabler for the bias drift effect in conventional devices, is eliminated in the disclosed LN modulator structure.

In another embodiment of the disclosure there is provided an optical waveguide device having one or more DC sections and an RF section. Preferably, the device mitigates DC bias drift. The device comprises an LN substrate, a highly doped semiconductor layer deposited over the optical waveguide in the DC sections, a buffer layer deposited over the optical waveguide in the RF section, and a metal layer that contacts the semiconductor layer. The metal layer may contact the semiconductor layer outside the optical waveguide or inside the optical waveguide.

In another embodiment of the disclosure there is provided an LN modulator structure for mitigating DC bias drift comprising a highly doped semiconductor layer patterned above an optical waveguide having one or more DC sections and an RF section, wherein a metal contact is in contact with a portion of the semiconductor layer and a buffer layer is deposited in the RE section. The metal contact may be in contact with a portion of the semiconductor layer either outside the optical waveguide or inside the optical waveguide.

In another embodiment of the disclosure, there is provided a method for making an LN electro-optical modulator. Preferably, the modulator mitigates DC bias drift. The method comprises the step of providing an LN substrate in the form of an optical waveguide having one or more DC sections and an RF section. Preferably, the optical waveguide is formed in a Mach-Zehnder configuration. Preferably, the LN substrate comprises a layer of titanium deposited and patterned on top of the substrate and diffused into the substrate. By example, a thin layer of metal, such as titanium (Ti), preferably having a thickness of about 600A-1000A (Angstroms) before diffusion, and more preferably having a thickness of about 850A-900A (Angstroms), may be deposited and patterned on top of the LN substrate. This layer is then diffused into the LN substrate in an oxygen ambient to form the optical waveguide structure in the Mach-Zehnder configuration. The method further comprises the step of depositing a buffer layer over the optical waveguide in the RF section. Preferably, the buffer layer may comprise oxides, such as silicon dioxide, tin oxide, indium oxide, or a combination of such oxides, or another suitable material. By example, a 0.5-1.0 µm (micrometer) buffer layer of silicon dioxide ($SiO_2$) may be deposited on the entire LN substrate and then removed in the DC sections of the device, so that the buffer layer is only in the RF section. The method further comprises the step of depositing a highly doped semiconductor layer patterned over the optical waveguide in the DC sections. The highly doped semiconductor layer may comprise silicon, germanium, gallium arsenide, or another suitable material. The highly doped semiconductor layer preferably has a doping level in the range of $10^{18}$ cm$^{-3}$ to $10^{19}$ cm$^{-3}$ to facilitate good ohmic contact sufficient to allow uniform distribution of the electric field with a metal layer or contact discussed below. Preferably, the highly doped semiconductor layer has a thickness in the range of 200A-800A (Angstroms). More preferably, the thickness is about 500A (Angstroms). The highly doped semiconductor layer functions as an electrical layer over the optical waveguide in the DC sections and as an upper cladding layer for the optical waveguide. By example, the deposition of a 500A (Angstroms) layer of highly doped ($10^{18}$-$10^{19}$ cm$^{-3}$) p-type polycrystalline or amorphous silicon using chemical vapor deposition or sputtering can be performed on the waveguide. The semiconductor layer is preferably patterned above the waveguide only in the DC section of the modulator and removed in the entire RF section, as shown in FIG. 5. The method further comprises the step of depositing a metal layer that contacts the semiconductor layer. The metal layer may contact the semiconductor layer either outside the optical waveguide or inside the optical waveguide. Preferably, the metal layer comprises a metal such as gold, aluminum, a gold/aluminum mixture, copper, or another suitable metal. By example, a thin aluminum/gold double conductive or metal layer may be deposited on the entire LN substrate, with aluminum forming an ohmic contact to the highly doped p-type silicon layer, and with gold forming a base layer (plating plate) for the subsequent gold plating of the modulator electrodes. The method further comprises the step of providing one or more electrodes over the optical waveguide in the RF section, and providing one or more electrodes over the optical waveguide in one or more DC sections. The electrode pattern above the optical waveguide in the DC section of the modulator is preferably limited to an area outside the waveguide region that is electrically contacted to the doped semiconductor layer using the stem portion of the semiconductor layer (see FIGS. 4 and 6). This small contact area may be connected to pads (not shown) to provide access points for outside electrical connections. The gold electrodes are then plated to an appropriate thickness and the plating plate is removed to complete the LN modulator fabrication. The gold may be deposited anywhere on the waveguide except over the semiconductor layer.

In another embodiment of the disclosure, there is provided a method of mitigating DC bias drift using one or more of the embodiments of the LN electro-optical modulator as described herein.

Figure 7:
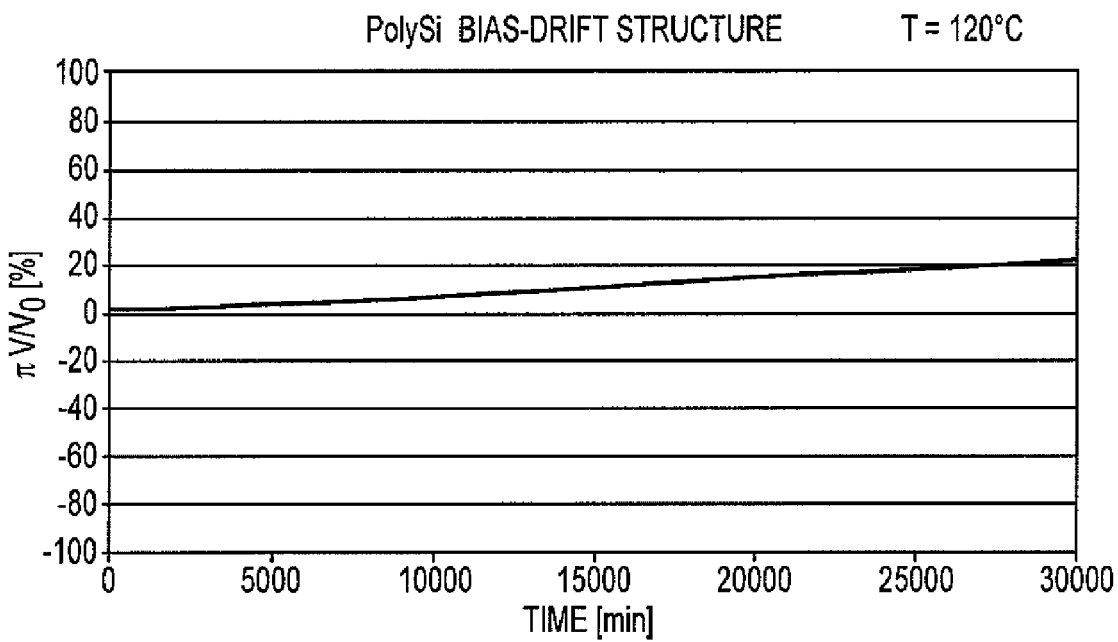
FIG. 7 is a diagram showing DC bias drift characteristics of an LN modulator according to one of the embodiments of the disclosure; and, FIG. 8 is a diagram showing DC bias drift characteristics of a doped buffer layer of a conventional optical modulator.
Figure 8:
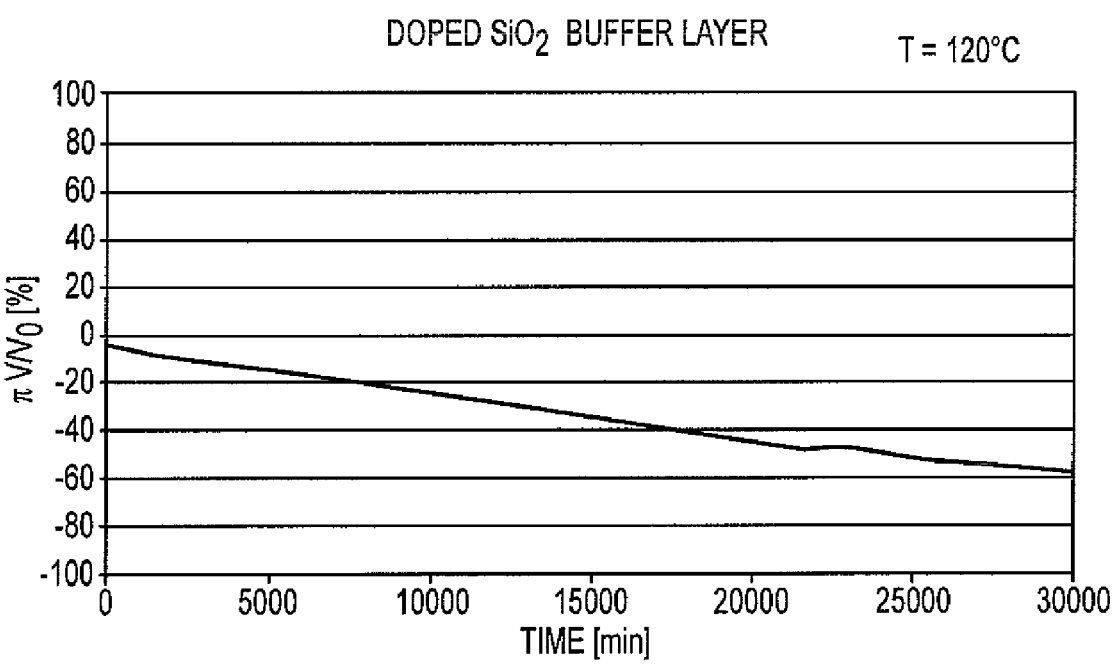

FIG. 7 is a diagram showing DC bias drift characteristics of an LN modulator according to an embodiment of the disclosure. FIG. 8 is a diagram showing DC bias drift characteristics of a doped $SiO_2$ (silicon dioxide) buffer layer of a conventional optical modulator.

The complex optical refractive index of the semiconductor layer is such that performing as a cladding layer for the optical waveguide does not result in a loss of optical confinement or optical attenuation. The uniform electric field without the presence of a metal layer on top of the entire length of the electrode results in minimal optical insertion loss in the waveguide.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A Z-cut lithium niobate electro-optical modulator comprising:
   a lithium niobate substrate in a form of an optical waveguide having one or more DC sections and an RF section;
   a highly doped semiconductor layer patterned directly on top of the optical waveguide and patterned in the one or more DC sections, wherein the semiconductor layer has an absence of a metal layer on top of the semiconductor layer, and wherein a bias voltage is applied to the semiconductor layer via a metal contact layer that contacts the semiconductor layer outside of the optical waveguide and below the semiconductor layer;
   a buffer layer deposited directly over the optical waveguide in the RF section and without contact with the one or more DC sections;
   one or more electrodes over the buffer layer,
   wherein the modulator mitigates a DC bias drift.

2. The modulator of claim 1 wherein the absence of the metal layer on top of the semiconductor layer results in minimal optical insertion loss in the waveguide.

3. The modulator of claim 1 wherein the lithium niobate substrate further comprises a layer of titanium deposited and patterned on top of the substrate and diffused into the substrate.

4. The modulator of claim 1 wherein the highly doped semiconductor layer comprises a material selected from the group consisting of silicon, germanium, and gallium arsenide.

5. The modulator of claim 1 wherein the highly doped semiconductor layer has a doping level in the range of $10^{18}$ cm$^{-3}$ to $10^{19}$ cm$^{-3}$ to allow a uniform distribution of an electric field with the metal contact layer.

6. The modulator of claim 1 wherein the highly doped semiconductor layer has a thickness in the range of 200 Angstroms to 800 Angstroms.

7. The modulator of claim 1 wherein the highly doped semiconductor layer functions as an electrical layer over the optical waveguide in the one or more DC sections and as an upper cladding layer for the optical waveguide.

8. The modulator of claim 1 wherein the buffer layer comprises a material selected from the group consisting of silicon dioxide, tin oxide, indium oxide, and a mixture of two or more thereof, and further wherein when the buffer layer is in the RF section, a DC (direct current) switching voltage is reduced.

9. The modulator of claim 1 wherein the metal contact layer comprises a material selected from the group consisting of gold, aluminum, gold/aluminum mixture, and copper.

10. A Z-cut optical modulator device for mitigating a DC bias drift, the device having one or more DC sections and an RF section, the device comprising:
a lithium niobate substrate in a form of an optical waveguide;
a highly doped semiconductor layer deposited directly on top of the optical waveguide and deposited in the one or more DC sections, wherein the semiconductor layer has an absence of a metal layer on top of the semiconductor layer and provides a uniform DC electric field along a length of the optical waveguide in the one or more DC sections, and wherein a bias voltage is applied to the semiconductor layer via a metal contact layer that contacts the semiconductor layer outside of the optical waveguide and below the semiconductor layer;
a buffer layer deposited directly over the optical waveguide in the RF section and without contact with the one or more DC sections and,
one or more electrodes over the buffer layer.

11. The device of claim 10 wherein the device has a reduced DC switching voltage due to the absence of the buffer layer in the one or more DC sections.

12. A Z-cut lithium niobate modulator structure for mitigating DC bias drift comprising a highly doped semiconductor layer patterned directly on top of an optical waveguide having one or more DC sections and an RF section, wherein the semiconductor layer has an absence of a metal layer on top of the semiconductor layer, and further wherein a bias voltage is applied to the semiconductor layer via a metal contact that contacts the semiconductor layer at a single point outside of the optical waveguide, and further wherein a buffer layer is deposited over the optical waveguide in the RF section and without contact with the one or more DC sections.

13. A method for making a Z-cut lithium niobate electro-optical modulator that mitigates a DC bias drift, the method comprising:
providing a lithium niobate substrate in a form of an optical waveguide having one or more DC sections and an RF section;
depositing a buffer layer directly over the optical waveguide in the RF section and without contact with the one or more DC sections;
depositing a highly doped semiconductor layer patterned directly on top of the optical waveguide and patterned in the one or more DC sections, wherein the semiconductor layer has an absence of a metal layer on top of the semiconductor layer;
depositing a metal contact layer that contacts the semiconductor layer and applies a bias voltage to the semiconductor layer, wherein the metal contact layer is located outside of the optical waveguide and below the semiconductor layer; and,
providing one or more electrodes over the buffer layer.

14. The method of claim 13 wherein the optical waveguide is formed in a Mach-Zehnder configuration.

15. The method of claim 13 wherein the lithium niobate substrate comprises a layer of titanium deposited and patterned on top of the substrate and diffused into the substrate.

16. The method of claim 13 wherein the highly doped semiconductor layer comprises a material selected from the group consisting of silicon, germanium, and gallium arsenide.

17. The method of claim 13 wherein the highly doped semiconductor layer has a doping level in the range of $10^{18}$ cm$^{-3}$ to $10^{19}$ cm$^{-3}$ to allow a uniform distribution of an electric field with the metal contact layer.

18. The method of claim 13 wherein the highly doped semiconductor layer has a thickness in the range of 200 Angstroms to 800 Angstroms.

19. The method of claim 13 wherein the highly doped semiconductor layer functions as an electrical layer over the optical waveguide in the one or more DC sections and as an upper cladding layer for the optical waveguide.

20. The method of claim 13 wherein the buffer layer comprises a material selected from the group consisting of silicon dioxide, tin oxide, indium oxide, and a mixture of two or more thereof, and further wherein when the buffer layer is in the RF section, a DC (direct current) switching voltage is reduced.

21. The method of claim 13 wherein the metal contact layer comprises a material selected from the group consisting of gold, aluminum, gold/aluminum mixture, and copper.

* * * * *